United States Patent
Clemen, Jr. et al.

(10) Patent No.: US 10,415,941 B2
(45) Date of Patent: Sep. 17, 2019

(54) SYSTEM FOR VISUAL OBSCURATION OF AN OBJECT AND DISSIPATING ENERGY OF A LASER WEAPON

(71) Applicant: The Boeing Company, Chicago, IL (US)

(72) Inventors: Mark J. Clemen, Jr., Port Orchard, WA (US); Donald V. Drouin, Jr., O'Fallon, IL (US); Stephen N. Provost, Saint Louis, MO (US); Roger D. Bernhardt, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 353 days.

(21) Appl. No.: 15/234,459

(22) Filed: Aug. 11, 2016

(65) Prior Publication Data

US 2018/0045497 A1    Feb. 15, 2018

(51) Int. Cl.
| | |
|---|---|
| *F42B 12/48* | (2006.01) |
| *F41H 13/00* | (2006.01) |
| *G01S 17/02* | (2006.01) |
| *F41H 9/06* | (2006.01) |

(Continued)

(52) U.S. Cl.
CPC ............... *F42B 12/48* (2013.01); *F41H 3/02* (2013.01); *F41H 5/007* (2013.01); *F41H 9/06* (2013.01); *F41H 13/005* (2013.01); *F41H 13/0056* (2013.01); *F41H 13/0087* (2013.01); *G01S 17/026* (2013.01); *F41H 13/0062* (2013.01)

(58) Field of Classification Search
CPC . F42B 12/48; F41H 5/007; F41H 3/02; F41H 13/0087; F41H 13/005; F41H 9/06; F41H 13/0056; F41H 13/0062; G01S 17/026

USPC ......................................................... 250/330
See application file for complete search history.

(56) References Cited

U.S. PATENT DOCUMENTS

| | | |
|---|---|---|
| 5,612,503 A | 3/1997 | Sepp |
| 5,837,918 A | 11/1998 | Sepp |

(Continued)

FOREIGN PATENT DOCUMENTS

| | | | |
|---|---|---|---|
| DE | 196 01 506 | 7/1997 | |
| WO | WO-2011134595 A1 * | 11/2011 | ........... F41H 13/005 |

OTHER PUBLICATIONS

EP, Partial European Search Report; European Patent Application No. 17181977.4; 15 pages (Jan. 2, 2018).

*Primary Examiner* — David P Porta
*Assistant Examiner* — Gisselle M Gutierrez
(74) *Attorney, Agent, or Firm* — Vivacqua Law

(57) ABSTRACT

A visual obscurant system for obscuring object from an observer having a field of view (FOV) is disclosed. The system comprises a sensor for detecting characteristics that indicate a presence of the object, a light source for emitting light in an electromagnetic spectrum, a source, and a controller. The source releases an obscurant into atmosphere to create a cloud. The obscurant attenuates a portion of the electromagnetic spectrum. The cloud is positioned within the FOV of the observer so as to obscure the object when the light emitted from the light source is directed towards the cloud. The controller is in communication with at least the sensor and the source. The controller modulates the light source at a frequency sufficient such that the observer interprets the light as being constant when energized.

16 Claims, 2 Drawing Sheets

(51) Int. Cl.
*F41H 3/02* (2006.01)
*F41H 5/007* (2006.01)

(56) References Cited

U.S. PATENT DOCUMENTS

| | | | |
|---|---|---|---|
| 6,484,640 B1 * | 11/2002 | Schneider | F41H 9/06 |
| | | | 102/334 |
| 6,989,525 B2 * | 1/2006 | Howard | F41J 2/00 |
| | | | 250/221 |
| 7,440,190 B2 | 10/2008 | Ullman et al. | |
| 7,483,454 B2 | 1/2009 | Hauck et al. | |
| 8,051,761 B1 | 11/2011 | Ullman et al. | |
| 2006/0234191 A1 | 10/2006 | Ludman | |
| 2008/0295677 A1 | 12/2008 | Real et al. | |
| 2014/0022547 A1 * | 1/2014 | Knox | G01N 21/49 |
| | | | 356/338 |

* cited by examiner

SYSTEM FOR VISUAL OBSCURATION OF AN OBJECT AND DISSIPATING ENERGY OF A LASER WEAPON

FIELD

The disclosed system and method relate to a system for obscuring an object and, more particularly, to a system for obscuring an object from an observer using a cloud comprising an obscurant, where the observer may belong to an unfriendly force.

BACKGROUND

Military and law enforcement personnel are often involved in peacekeeping, humanitarian, and counter-terrorism missions. For example, law enforcement personnel may be involved in crowd control and disbursement operations during a riot. Sometimes these personnel may need to release an obscurant into the surrounding areas in order to decrease visibility conditions. Obscurants are particles suspended in the air that block or weaken the transmission of a particular part or parts of the electromagnetic spectrum such as, for example, visible and infrared radiation, or microwaves. Obscurants include, but are not limited to, fog, smoke, and dust.

During military operations, an unfriendly force or enemy's surveillance and weapon systems may utilize visual or infrared sensors in order to view forces or other targets. Thus, obscurants may be used to conceal the location of these forces or other targets from the enemy. Indeed, obscurants play an important role in military operations, as they provide protection of personnel and equipment from the sensors of unfriendly forces. However, an obscurant conceals forces and targets not only from unfriendly forces, but also from view of everyone else as well. In other words, an obscurant will conceal objects from friendly forces as well, which may be disadvantageous in some situations. Thus, there exists a continuing need in the art to improve obscurant systems such that a target is concealed from hostile forces, but may also be viewed by friendly forces as well. Additionally, it should also be appreciated that there is also a continuing need in the art to improve obscurant systems for attenuating an laser weapons as well.

SUMMARY

In one example, a visual obscurant system for obscuring an object from an observer having a field of view (FOV) is disclosed. The system comprises a sensor for detecting characteristics that indicate a presence of the object, a light source for emitting light in an electromagnetic spectrum, a source, and a controller. The source releases an obscurant into atmosphere to create a cloud. The obscurant attenuates a portion of the electromagnetic spectrum. The cloud is positioned within the FOV of the observer so as to obscure the object while the cloud when the light emitted from the light source is directed towards the cloud. The controller is in communication with at least the sensor and the source. The controller modulates the light source at a frequency sufficient such that the observer interprets the light as being constant when energized. The controller activates the sensor immediately after the source emits light to view the object.

In another example, a system for dissipating a laser beam generated by a laser weapon is disclosed. The system comprises a sensor for detecting the laser beam generated by the laser weapon and an energy associated with the laser beam, a source for releasing an obscurant into the atmosphere to create a cloud, and a controller. The obscurant is an optically non-linear substance that may be externally energized by the laser beam generated by the laser weapon. The controller is in communication with both the sensor and the source. The controller activates the source to release the obscurant into the atmosphere to create the cloud based on the sensor detecting the laser beam generated by the laser weapon.

In yet another example, a method of obscuring an object from an observer having a field of view (FOV) is disclosed. The method comprises releasing, by a source, an obscurant into atmosphere to create a cloud. The obscurant attenuates a portion of the electromagnetic spectrum. The method further include emitting light, by a light source, in the electromagnetic spectrum. The cloud is positioned within the FOV of the observer so as to obscure the object when the light emitted from the light source is directed towards the cloud. The method further includes activating a sensor immediately after the light source emits light in order to view the object. The sensor detects characteristics that indicate a presence of the object. Finally, the method includes modulating the light source by a controller at a frequency sufficient such that the observer interprets the light as being constant. The controller is in communication with at least the sensor and the light source.

Other objects and advantages of the disclosed method and system will be apparent from the following description, the accompanying drawings and the appended claims.

DETAILED DESCRIPTION

Figure 1:
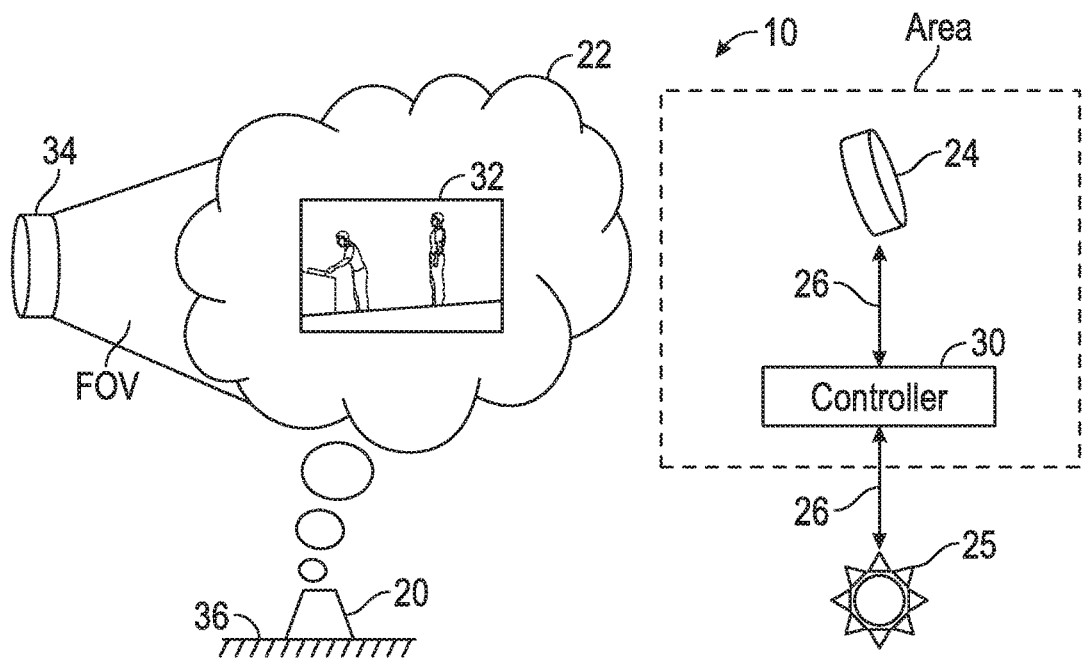
FIG. 1 is an exemplary schematic diagram of the disclosed visual obscurant system for obscuring an object by a cloud, where the object is still viewable by a sensor in communication with a controller.

FIG. 1 is an exemplary illustration of the disclosed visual obscurant system 10 according to one embodiment of the disclosure. In the example as shown, the system 10 includes a source 20 that produces at least one mass or cloud 22, a sensor 24, a light source 25, a link 26, and a controller 30. The link 26 may be used to connect the sensor 24, the light source 25, and the controller 30 together such that they are in communication with one another. The link 26 may be a hard-wired connection or a wireless connection, such as a wireless local area network (WLAN) connection. The cloud 22 may be formed of an obscurant or substance that is suspended within the atmosphere. As explained in greater detail below, the light source 25 may pulse light in a pseudo-random or preset modulation sequence. The pulses of light are reflected or fluoresced off the cloud 22 in order to appear constant, thereby obscuring an object or multiple objects 32 from a sensor or observer 34. At the same time, the objects 32 may be captured by the sensor 24 of the system 10.

The source 20 may be any device capable of releasing an obscurant into the atmosphere to create the cloud 22. In one approach, the source 20 may be stationary or part of a moving vehicle, such as a drone or an unmanned aerial vehicle (UAV). The source 20 may be located along a ground surface 36 or, alternatively, in the air. Furthermore, although only one source 20 is illustrated in FIG. 1, it is to be appreciated that the system 10 may include more than one source 20 as well, which would result in two or more clouds 22 being formed within the environment. In one exemplary embodiment, multiple sources may be co-located within the same vehicle. For example, two sources 20 may be co-located on the same drone. In still another embodiment, the source 20 may be thrown or projected like a grenade in order to release the obscurant.

The cloud 22 may be formed of any optically linear, dispersive, or luminescing substance that scatters, reflects, or fluoresces as a result of the light emitted by the light source 25 to obscure or attenuate the transmission of light in the visible, infrared, or ultraviolet portion of the electromagnetic spectrum. In one embodiment, the cloud 22 may be formed of an optically inactive substance, such as water vapor. In another embodiment, the substance may be optically fluorescent, such as silver iodide. In yet another embodiment, the substance may be reflective, such as titanium dioxide dust. In still another embodiment, the substance may be projected from a grenade, and the substance is smoke.

The source 25 may emit light in the electromagnetic spectrum, such as, for example, visible light having a frequency ranging from $4\times10^{14}$ Hz to $8\times10^{14}$ Hz, ultraviolet light having frequencies ranging from $8\times10^{14}$ to $3\times10^{16}$ Hz, or IR light having frequencies ranging from $3\times10^{11}$ to $4\times10^{14}$ Hz. The light emitted from the source 25 may be directed towards the cloud 22. Depending on the substance of the cloud 22, the light emitted from the source 25 may be scattered off the cloud or, alternatively, the substance may absorb the light and emit a fluorescence. For example, in one approach if the substance of the cloud 22 is a reflective material, then the light emitted from the source 25 may be scattered off the cloud. Alternatively, in another embodiment, if the substance of the cloud 22 is an optically fluorescent material, then the cloud 22 may emit a fluorescence.

It is to be appreciated that the light scattered off the cloud 22 or the florescence emitted from the cloud 22 may obscure visibility of the objects 32. The cloud 22 is positioned within the field of view (FOV) of the observer 34 so as to obscure the object 32 when light emitted from the source 25 is directed towards the cloud 22. Thus, if the objects 32 are located either within or positioned the other side of the cloud 22, then the objects 32 are not visible to the human eye or to optic sensors while the cloud 22 emits light. In the non-limiting embodiment as shown in FIG. 1, the objects 32 are positioned within the cloud 22 such that the cloud 22 obscures the objects 32 from the observer 34. However, it is to be appreciated that in another embodiment, the objects 32 may be positioned behind the cloud 22, within Area A. Thus, the cloud 22 may obscure the objects 32 from the observer's FOV.

The objects 32 may encompass any apparatus, structure, individuals, or group of individuals that may need to be concealed from the observer 34, but at the same time are still visible to the sensor 24. For example, in one embodiment the object 32 may be an aircraft, such as an airplane or helicopter, or a ground-based vehicle or structure. In another embodiment, the objects 32 may represent a portion of a battlefield, so as to obscure vision in an area where troops are moving. Thus, the observer 34 is unable to determine how many troops are present, or in which direction they are moving through the battlefield. In still another embodiment, the objects 32 may represent law enforcement personnel that are responding to a riot or other disturbance.

In one embodiment, the observer 34 may be an individual or a group of individuals, such as troops belonging to an unfriendly force, or a sniper. However, in another embodiment the observer 34 may be a sensor or other type of system that captures images such as, for example, an IR camera, or a time-of-flight camera (ToF camera). It is to be appreciated that the observer 34 may represent individuals or apparatuses belonging to an unfriendly or hostile force. Thus, it is important that the system 10 conceal the objects 32 from view by the observer 34.

Figure 2:
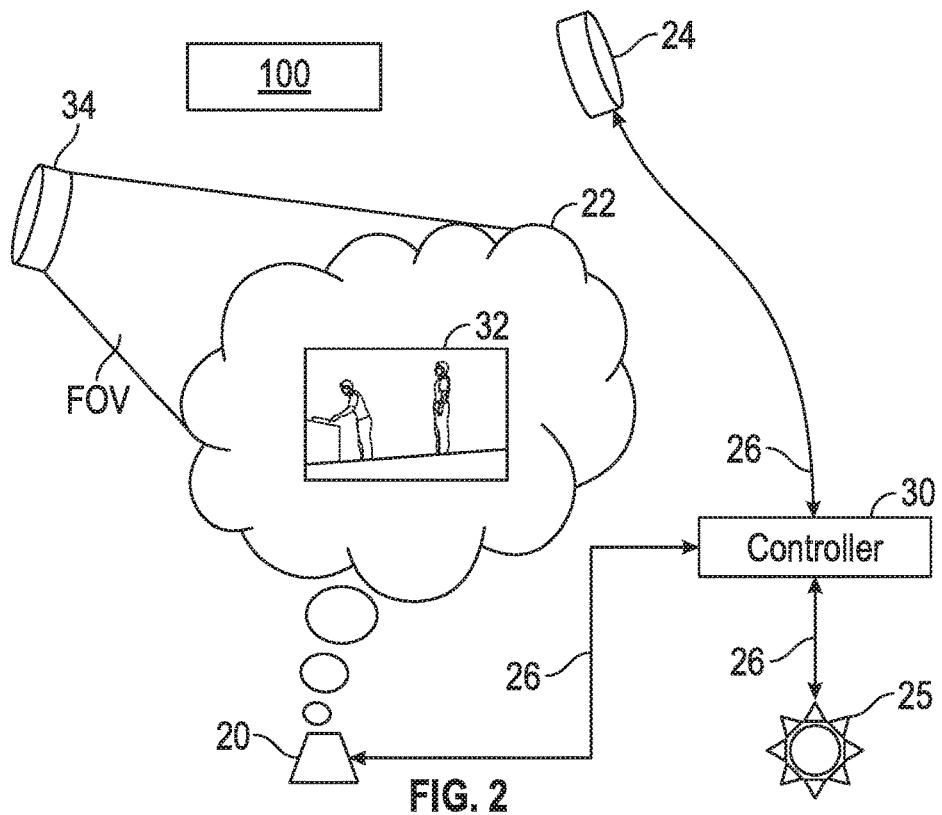
FIG. 2 is an alternative embodiment of the visual obscurant system shown in FIG. 1 where the sensor determines the presence of an object that is external to the system.

The sensor 24 may be any type of sensor, system, or camera that is capable of detecting characteristics that indicate a presence of an object, such as an apparatus or human. For example, in one embodiment the sensor 24 may be an IR camera or a ToF camera. In the embodiment as shown in FIG. 1, the sensor is positioned within the system 10 in order to view the cloud 22. In the embodiment as shown in FIG. 2, the sensor 24 is positioned within the system 10 so as to detect the presence of an object 100 that is external to the system 10 as well as to view the cloud 22. It is to be appreciated that in one embodiment, the external object 100 may be indicative of an unfriendly force's aircraft, ground-based vehicle or structure, or the presence of troops. In another embodiment, the external object 100 may be an unfriendly force's energy weapons and may include, but are not limited to, electromagnetic radiation, particles with mass, or sound produced by sonic weapons.

Referring back to FIG. 1, in one embodiment the sensor 24 may be capable of detecting electromagnetic radiation such as radio frequency (RF), microwave, lasers and masers. Additionally, the sensor 24 may be capable of detecting a mass or even sound. For example, in one approach the sensor 24 may be capable of detecting the presence of a human. In one embodiment, the sensor 24 may be a passive sensor that responds to an external input, such as detecting an IR, a light detection and ranging (LIDAR), or radar signal. In an alternative embodiment, the sensor 24 may be an active sensor that measures signals transmitted by the sensor that were reflected, refracted or scattered by an external object. In one embodiment, the sensor 24 may detect a specific or particular wavelength of light, such as IR wavelengths.

The controller 30 may refer to, or be part of an electronic circuit, a combinational logic circuit, a field programmable gate array (FPGA), a processor (shared, dedicated, or group) that executes code, or a combination of some or all of the above, such as in a system-on-chip. In the example as shown in FIG. 1, the controller 30 is in communication with both the sensor 24 and the source 25 via the link 26. In the example as shown in FIG. 2, the controller 30 is in communication with the source 20, the sensor 24, and the source 25 via the link 26.

The controller 30 may include circuitry or control logic for causing the source 25 to emit light at a pseudo-random or preset modulation sequence. Specifically, the source 25 is modulated at a frequency sufficient so that the observer 34 views or interprets the light emitted from the cloud 22 as being constant. For example, if the cloud 22 is made up of a reflecting substance, such as titanium dioxide dust, and the source 25 emits visible light, then the observer 34 is unable to capture, view, or otherwise see the object 32 because the cloud 22 appears to be constantly reflecting the visible light from the source 25. However, it is to be appreciated that the controller 30 is aware of the modulation pattern and frequency of the source 25. Therefore, the sensor 24 may be synchronized with the modulation pattern of the source 25 such that the sensor 24 is activated or triggered to capture or view the objects 32 immediately after the source 25 emits light. Thus, it is to be appreciated that only the sensor 24, and not the observer 34, is able to capture or view the object 32 located within the cloud. Indeed, because the observer 34 is unaware of the modulation pattern and frequency of the light emitted by the source 25, the observer 34 is unable to view the object 32. In one embodiment, the light emitted by the source 25 may be emitted or flashed at pulse repetition frequencies from about 10 to about 100 megahertz (MHz).

It is to be appreciated that in the embodiment as shown in FIG. 1, the visual obscurant system 10 may be activated at all times. That is, the source 25 is continuously flashing light to obscure the object 32 from view by the observer 34. However, sometimes it may be preferable to only obscure the object 32 as a defensive strategy. Specifically, the object 32 may only be obscured upon detection of an external or foreign object, such as an unfriendly force's aircraft, ground-based vehicle or structure, the presence of troops, or the energy emitted from an enemy's weapons. FIG. 2 is an alternative embodiment of the visual obscurant system 10 shown in FIG. 1, where the sensor 24 is now positioned so as to detect the presence of the external object 100 approaching the system 10 as well as the object 32. Upon detection of the external object 100, the controller 30 may first activate the source 20 to emit the obscurant into the atmosphere to create the cloud 22. Then, the controller 30 may initiate the emission of modulated light from the source 25.

Referring generally to both FIGS. 1 and 2, the disclosed visual obscurant system 10 may obscure the objects 32 from an unfriendly force, but the objects 32 are still viewable by the sensor 24. The sensor 24 is phased in synchronicity with the modulated light emitted from the light source 25 to thereby capture the object 32. Current systems that employ an obscurant to hide an object from an enemy or unfriendly force also result in the objects being obscured from view by everyone. In contrast, the disclosed sensor 24 is capable of viewing the object, as it is phased with the modulation sequence of the light emitted from the light source 25.

Figure 3:
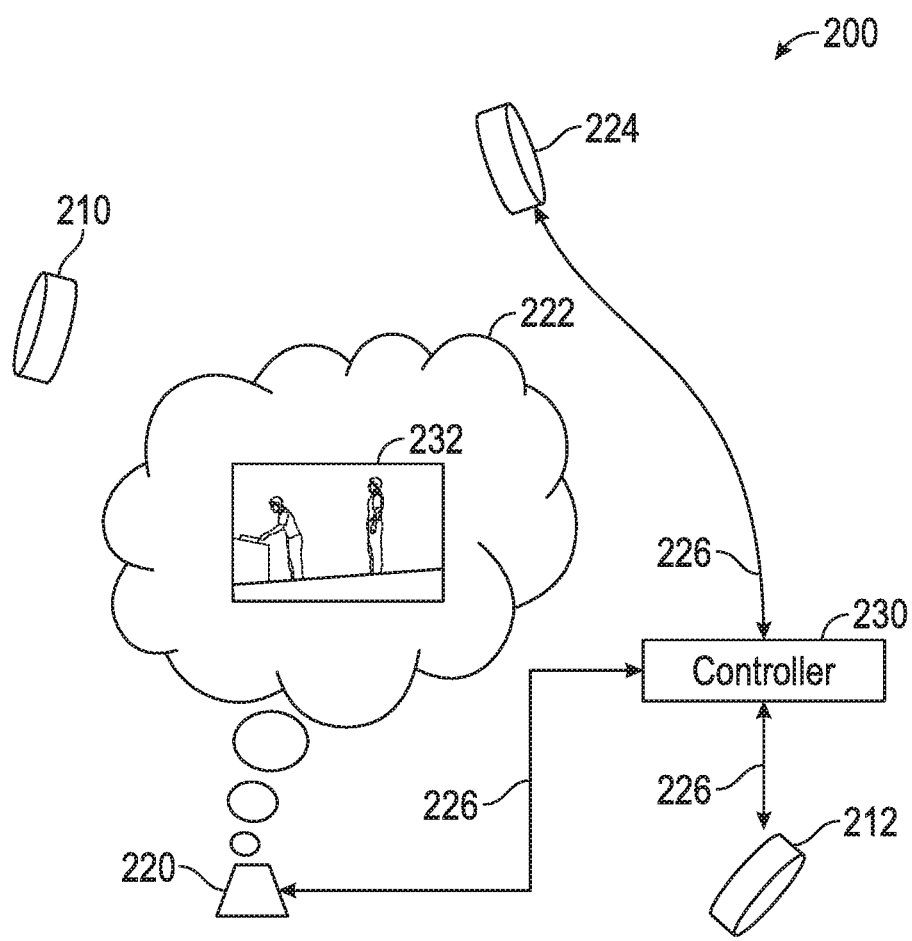
FIG. 3 is yet another embodiment of the system, where the cloud shown in FIG. 1 is used to dissipate the energy generated by an incoming laser weapon.

FIG. 3 is yet another embodiment of a system 200. Unlike the embodiment as shown in FIGS. 1-2, the system 200 may be used to dissipate or scatter the energy generated by an incoming laser weapon based on either two-photon or multi-photon absorption. Specifically, as explained in greater detail below, the system 200 may be used to absorb the light generated by an unfriendly force's laser weapons, and re-emits the light as heat and an incoherent form of light. The system 200 may include a laser weapon 210, an optional defensive laser 212, a source 220 for emitting a cloud 222, a sensor 224, a link 226, and a controller 230. The link 226 may be used to connect the defensive laser 212, the source 220, the sensor 224, and the controller 230 together such that they are in communication with one another.

As seen in FIG. 3, the cloud 222 may surround or protect a target 232. Similar to the embodiment as shown in FIGS. 1 and 2, the target 232 may be an aircraft, such as an airplane or helicopter, a ground-based vehicle or structure, a portion of a battlefield, or troops. The cloud 222 may be used to dissipate a laser beam generated by the laser weapon 210, and thereby protects the target 232.

The cloud 222 may be an obscurant that is an optically non-linear substance externally energized by the laser beam generated by the laser weapon 210. For example, in one embodiment the cloud 222 may include optical nanoparticles, such as quantum dots. Those of ordinary skill in the art will readily appreciate that quantum dots are nanoparticles composed of periodic groups of III-V or II-VI semiconductor materials. Furthermore, it should also be appreciated that addition or removal of an electron within a quantum dot produces light. In the embodiment as shown in FIG. 3, the quantum dots may be an inert compound such as, for example zinc oxide, (ZnO), zinc sulfide (ZnS), aluminium nitride (AlN), various silica compounds, or peptides. It is to be appreciated that peptides are short chains of amino acids linked by amide bonds. Amino acids that may be used as quantum dots include those with non-localized electron potentials such as phenyl rings (e.g., phenylalanine, tyrosine, or tryptophan). Histidine is an example of an amino acid with a non-localized electron potential that may be used to build larger quantum dot structures. Furthermore, amino acids with electrically charged side chains such as arginine, histidine, and lysine may also form peptides as quantum dots in combination with amino acids with uncharged side chains such as glutamine. In one embodiment, peptides may bind with pre-prepared metallic or semiconducting quantum dot nanoparticles that are toxic to living beings such as telluride or cadmium selenide (CdSe). In this embodiment, a surface of the quantum dot may be bonded to a shell of the peptide to mask an underlying material from the biological interactions that would otherwise make the quantum dot toxic. In this case, the peptide shell includes chains of amino acids that bond to metals or semiconductors without forming peptides that interfere with the quantum dot potential. Examples would include shorter chain amino acids such as glycine or alanine, or more effectively with a functional group that may bond to the metal or semiconductor such as cysteine or selenocysteine. Alternatively, in one embodiment the quantum dot may be coated with a thin layer of a silica and then coated with a peptide. In one embodiment, the combination of these compounds may be located around a central quantum dot. The selection of the specific material appropriate for the quantum dot may be tailored to absorb light emitted from the laser weapon 210, and re-emits the light at the same or a different frequency.

The laser weapon 210 may be any type of laser that may be used by unfriendly forces. The laser weapon 210 may direct a laser beam towards the target 232. The laser beam generated by the laser weapon 210 may range in power anywhere from about 1 Watt to about 1,000,000 Watts in power or more, however those of ordinary skill in the art will appreciate that the power of the laser beam hitting the target may depend upon the size and quality of the laser beam, atmospheric conditions, and distance of the target 232. Specifically, for example, the further the target 232 is situated from the laser weapon 210, the lower the power of the laser beam hitting the target.

The sensor 224 may be any type of sensor, system, or camera that is capable of detecting characteristics of the laser beam emitted by the laser weapon 210. Specifically, the sensor 224 may be able to detect the frequency or energy emitted by the laser beam of the laser weapon 210. For example, in one embodiment the sensor 24 may be an array of photodiodes, phototransistors, or based on a complementary metal-oxide-semiconductor (CMOS) imaging sensor. The sensor 224 is in communication with the controller 230. Once the sensor 224 detects an incoming threat by determining the laser weapon 210 has emitted a laser beam, the controller 230 may then activate the source 220 to release the obscurant. As explained in greater detail below, the controller 230 may also activate the defensive laser 212 to emit a laser beam that is directed towards the cloud 222. Specifically, the defensive laser 212 may be activated based on the material of the cloud 222 as well as the characteristics of the laser beam emitted by the laser weapon 210. The laser beam emitted by the defensive laser 212 may be introduced in order to introduce the energy required in order for the obscurant in the cloud 222 to make an energy transition. Specifically, the obscurant needs to be excited in order to make an energy transition in order to dissipate the energy from the laser weapon 210 into heat and incoherent light, or to ionize the obscurant of the cloud 22. However, it is to be appreciated that in some instances, the extra energy introduced by the defensive laser 212 may not be required for heat and light generation or ionization.

The laser beam emitted from the laser weapon 210 includes a predetermined amount of energy. It is to be appreciated that the energy of the laser beam may be measured by an electron volt (eV). Those of ordinary skill in the art will readily appreciate that an electron volt is the amount of energy gained or lost by the charge of a single electron moving across an electric potential difference of one volt. Once the sensor 224 detects the laser beam emitted from the laser weapon 210, the controller 230 may then activate the source 220 to release the obscurant that comprises the cloud 222.

It is to be appreciated that the sensor 224 not only detects the presence of an incoming threat laser beam, but also the energy associated with the laser beam. The controller 230 may determine if it is necessary to activate the defensive laser 212 based on the energy of the laser beam emitted by the laser weapon 210 as well as the specific properties of the obscurant. Specifically, in one exemplary illustration, the laser weapon 210 emits a laser beam having an energy of about 1 eV, and the obscurant of the cloud 222 requires about 1.5 eV to make an energy transition. Thus, it is to be appreciated that the laser beam emitted by the laser weapon 210 may not be dissipated into heat and incoherent light because the laser beam emitted by the laser weapon 210 is not sufficient to excite the obscurant to the 1.5 eV required in order to make the energy transition. Thus, the controller determines that the defensive laser 212 should be activated. Specifically, the defensive laser 212 may be activated to emit a defensive laser beam having an energy of at least 0.5 eV, which excites the obscurant and dissipates the laser beam from the laser weapon 210.

It is to be appreciated that the activation of the defensive laser 212 is not always necessary. That is, if the laser beam emitted by the laser weapon 210 has an energy that will sufficiently excite the obscurant in order to make the energy transition, then the defensive laser 212 may not be required. For example, if the laser weapon 210 emits a laser beam having an energy of about 2 eV and the obscurant of the cloud 222 requires an energy transition of about 2 eV, then it is to be appreciated that the defensive laser 212 may not be required in order to dissipate the laser beam from the laser weapon 210.

It is to be appreciated that in one embodiment, the obscurant of the cloud 222 may be ionized in order to produce electron plasma. Those of ordinary skill in the art will readily appreciate that electron plasma increases the scattering of light emitted by the laser beam from the laser weapon 210. In order to produce the electron plasma, the obscurant of the cloud 222 needs to be ionized, thereby leading to the emission of electrons. That is, in one embodiment, the laser weapon 210 includes an energy that is at least 1 eV more than the energy required to make an energy transition by the obscurant. For example, the laser weapon 210 may emit a laser beam having an energy of about 3 eV if the obscurant of the cloud 22 requires an energy transition of about 2 eV. Thus, the obscurant of the cloud 222 is ionized, which leads to the emission of an electron rather than just quantum excitation that emits incoherent light.

Alternatively, it is to be appreciated that in another embodiment the defensive laser 212 may be used to introduce the extra energy required in order to ionize the obscurant in the cloud 222. For example, the laser weapon 210 may emit a laser beam having an energy of about 2 eV and the defensive laser 212 may emit a laser beam having an energy of about 1 eV in order to ionize the obscurant of the cloud 222, where the obscurant requires an energy transition of about 2 eV.

While the forms of apparatus and methods herein described constitute preferred examples of this invention, it is to be understood that the invention is not limited to these precise forms of apparatus and methods, and the changes may be made therein without departing from the scope of the invention.

What is claimed is:

1. A visual obscurant system for obscuring an object from an observer having a field of view (FOV), the system comprising:
    a sensor for detecting characteristics that indicate a presence of the object and an external object that approaches the visual obscurant system and the object;
    a light source for emitting light in an electromagnetic spectrum;
    a source for releasing an obscurant into atmosphere to create a cloud, wherein the obscurant attenuates a portion of the electromagnetic spectrum, and wherein the cloud is positioned within the FOV of the observer so as to obscure the object when the light emitted from the light source is directed towards the cloud; and
    a controller in communication with at least the sensor, the source and the light source, the controller modulating the light source at a frequency sufficient such that the observer interprets the light as being constant, wherein the controller executes instructions to:
    detect the external object by the sensor;
    in response to detecting the external object, activate the source to release the obscurant; and
    activate the sensor immediately after the light source emits light to view the object.

2. The visual obscurant system of claim 1, wherein the external object is indicative of an unfriendly force.

3. The visual obscurant system of claim 1, wherein the external object is selected from a group comprising: an aircraft, a ground-based vehicle, a ground-based structure, troops, and energy weapons.

4. The visual obscurant system of claim 1, wherein the object is selected from a group comprising: an individual, a group of individuals, an aircraft, a ground-based vehicle, a ground-based structure, and a portion of a battlefield.

5. The visual obscurant system of claim 1, wherein the observer represents one of an individual and an apparatus belonging to an unfriendly force.

6. The visual obscurant system of claim 1, wherein the obscurant is selected from a group comprising: an optically inactive substance, an optically fluorescent substance, a reflective substance, and smoke.

7. The visual obscurant system of claim 1, wherein the object is positioned within the cloud.

8. The visual obscurant system of claim 1, wherein the object is positioned behind the cloud so as to obscure the object from the FOV of the observer.

9. The visual obscurant system of claim 1, wherein the controller modulates the light in a pseudo-random modulation sequence.

10. A system for dissipating a laser beam, the system comprising:
   a sensor for detecting the laser beam generated by the laser weapon and an energy associated with the laser beam, wherein the laser beam is generated by an unfriendly force's laser weapon;
   a source for releasing an obscurant into atmosphere to create a cloud, wherein the obscurant is an optically non-linear substance externally energized by the laser beam generated by the laser weapon; and
   a controller in communication with both the sensor and the source, wherein the controller activates the source to release the obscurant into the atmosphere to create the cloud based on the sensor detecting the laser beam generated by the laser weapon.

11. The system of claim 10, comprising a defensive laser in communication with the controller, wherein the defensive laser emits a defensive laser beam directed towards the cloud.

12. The system of claim 11, wherein the controller activates the defensive laser in response to determining the energy associated with the laser beam emitted by the laser weapon is not sufficient to excite the obscurant to an energy level required in order to make an energy transition.

13. The system of claim 11, wherein the controller activates the defensive laser in response to determining the energy associated with the laser beam emitted by the laser weapon is not sufficient to ionize the obscurant.

14. The system of claim 10, wherein the obscurant includes quantum dots.

15. The system of claim 10, wherein the cloud surrounds a target, and wherein the laser weapon directs the laser beam towards the target.

16. A method of obscuring an object from an observer having a field of view (FOV), the method comprising:
   detecting, by a sensor, an external object that approaches the object;
   in response to detecting the external object, releasing, by a source, an obscurant into atmosphere to create a cloud, wherein the obscurant attenuates a portion of an electromagnetic spectrum;
   emitting light in the electromagnetic spectrum by a light source, wherein the cloud is positioned within the FOV of the observer so as to obscure the object when the light emitted from the light source is directed towards the cloud;
   activating the sensor immediately after the light source emits the light in order to view the object, wherein the sensor detects characteristics that indicate a presence of the object; and
   modulating the light source by a controller at a frequency sufficient such that the observer interprets the light as being constant, wherein the controller is in communication with at least the sensor and the light source.

* * * * *